M. G. HUSTED.
LATHE ATTACHMENT.
APPLICATION FILED SEPT. 24, 1920.
1,401,702.
Patented Dec. 27, 1921.
2 SHEETS—SHEET 2.
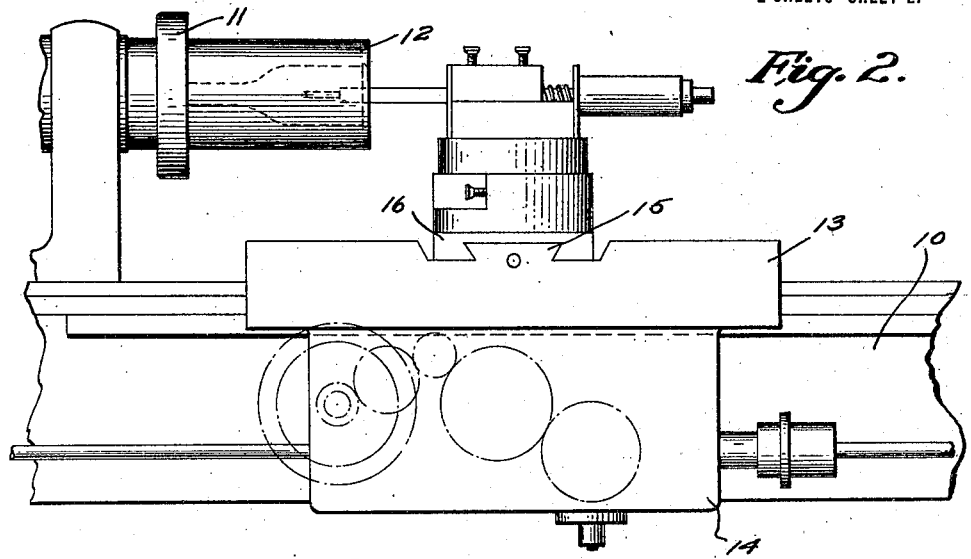
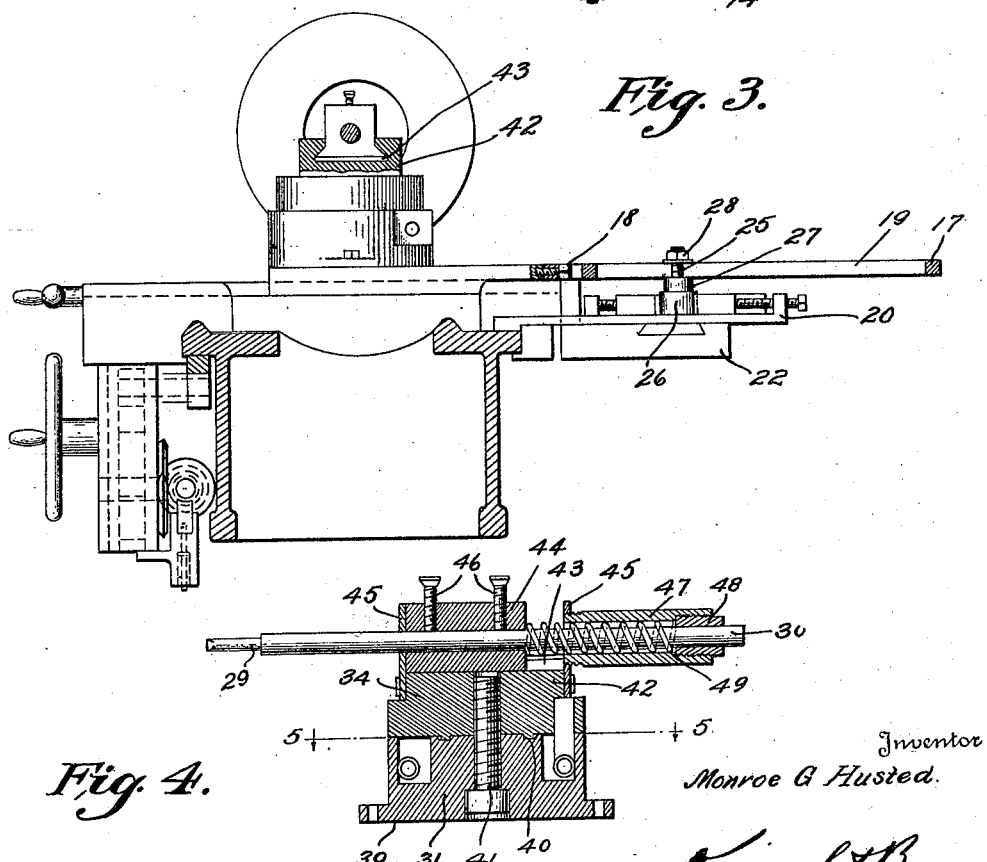
Inventor
Monroe G Husted.
By Knight Bros.
Attorneys

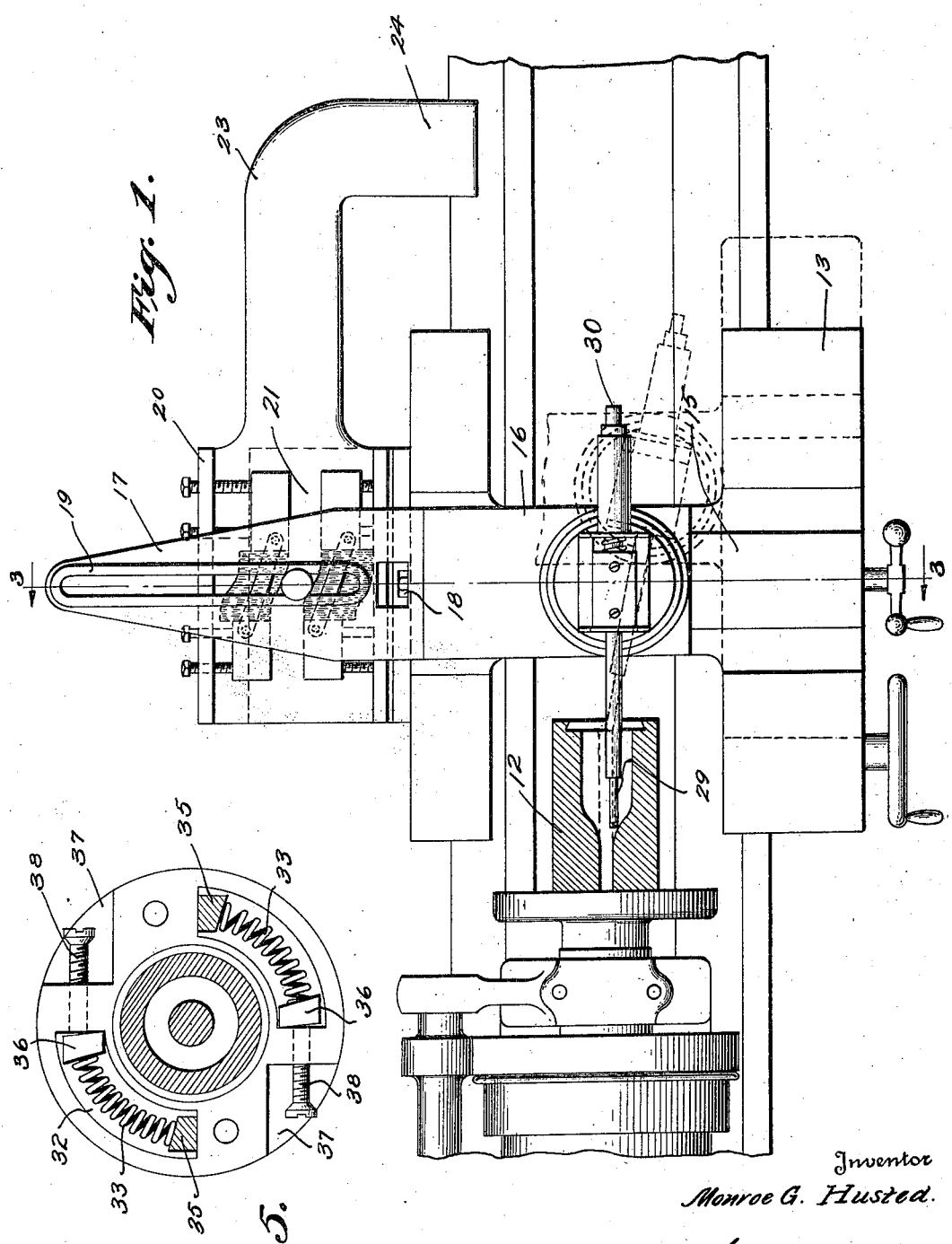

UNITED STATES PATENT OFFICE.

MONROE G. HUSTED, OF BRIDGETON, NEW JERSEY.

LATHE ATTACHMENT.

1,401,702.    Specification of Letters Patent.    Patented Dec. 27, 1921.

Application filed September 24, 1920. Serial No. 412,562.

*To all whom it may concern:*

Be it known that I, MONROE G. HUSTED, a citizen of the United States, and resident of Bridgeton, in the county of Cumberland and State of New Jersey, have invented certain new and useful Improvements in a Lathe Attachment, of which the following is a specification.

My invention relates to an attachment for lathes, and more particularly to a cutting tool carrier. I have illustrated the invention as used in connection with the type of lathe employing a rotary work carrier and a movable tool carrier, in which the tool is advanced toward and retracted from the work during the cutting operation. The type of lathe illustrated is particularly adapted for forming molds, but it should be understood that my invention is equally adaptable to other types of lathes, as will be made more apparent hereinafter.

One of the objects of my invention is to provide a carrier or holder for the cutting tool, in which the cutting tool may be resiliently supported. The invention contemplates for one portion thereof a rotatable tool holder in which are positioned springs. These springs tend to normally hold the tool in longitudinal alinement with the bore of the work. When the cutter is inserted into the work the holder is moved in a direction which is against the tension of the springs, thereby positioning the cutting tool at an angle to the work. A uniform pressure imparted by the tension of the springs is applied to the cutter during its cutting operation, and therefore a uniform layer of material will be removed during the cutting operation.

My invention contemplates the adjustment of the tension of the springs, thereby enabling greater or less pressure being applied to the cutting tool, to accommodate the same to materials of different degrees of toughness.

My invention is adapted to be used in connection with a cam groove, employed for the purpose of moving the tool transversely to properly fashion the work. In connection therewith my invention is intended to provide means for independently adjusting the transverse position of the cutting tool with respect to the cam groove, thereby enabling me to use the cutter for inside or outside cutting work, or for fashioning work of graduated sizes.

Various other features of importance will be made more apparent in the specification and the drawings, in which—

Figure 1 is a top plan view of a portion of a lathe, equipped with my invention;

Fig. 2 is a side elevation of the structure illustrated in Fig. 1;

Fig. 3 is a sectional view taken on line 3—3 of Fig. 1;

Fig. 4 is a sectional view of the tool holder; and

Fig. 5 is a view taken on line 5—5 of Fig. 1.

In the drawings, the numeral 10 indicates the bed of a lathe, and 11 a rotatable work holder, which may be rotated by any suitable source of power (not shown). Supported upon the work holder 11 is a work piece 12.

A traveling table or carriage 13 is positioned upon the lathe and adapted to travel longitudinally thereof. This traveling table 13 is actuated by suitable mechanism contained in a housing or apron 14. A detailed description of this mechanism is not necessary, inasmuch as it forms no particular part of this invention.

The table 13 is provided with a transversely disposed beveled tongue 15, upon which is mounted a tool supporting table or cross slide 16. The under face of this table 16 is suitably recessed for the reception of the beveled tongue 15. This arrangement enables the table 16 to be moved transversely of the lathe proper, for a purpose to be more fully hereinafter described.

Rigidly supported to one end of the table 16 is a slot-carrying member 17. This member 17 is connected to the table 16 by means of a bolt 18. The member 17 is also provided with an elongated slot 19. Also supported adjacent the side of the lathe is a cam groove member 20, which is provided with an ajustable cam groove 21. This cam groove member may be supported upon a table 22, having formed therewith an arm 23, by which connection is made with a lathe, as at 24. In this manner the cam groove member is supported immediately beneath the slot-carrying member 17. Positioned in the slot 19 is a pin 25, carrying at its lower end a roller 26. This roller 26 is adapted to travel in the cam groove 21, for a purpose also to be more fully hereinafter described. The pin 25 is capable of adjustment relative to the slot 19, and in order to firmly clamp the pin 25 in any of its adjusted positions, I provide a collar 27, which lies against the under face of the member 17, and a nut 28 screw-threadedly engaging the upper end of the pin 25 and bearing against the top face of the member 17.

From the mechanism thus far described it will be obvious that when the traveling table 13 is advanced toward or retracted from the work 12, the roller 26 will likewise travel in the cam groove 21. It should be understood that the cam member, and consequently the cam groove, are stationary, inasmuch as they are supported by the bed of the lathe. As the roller 26 travels in the cam groove 21, it will cause the table 16 to move transversely of the lathe. This is so by reason of the fixed relation of the pin 25 carrying the roller 26, the slot member 17, and the table 16. Therefore, the tool carrying table 16 will move the tool supported thereon in a manner to fashion the work to a shape corresponding to the adjusted shape of the cam groove 21.

I will now describe the manner in which I resiliently mount the cutting tool. The cutting tool is indicated by the numeral 29, and is formed with an elongated shank 30. The tool carrying member consists of a base 31, which is provided with arc-shaped recesses 32 adapted to receive coil springs 33. Positioned upon this base 31 is a rotary member 34, which is provided with two depending lugs 35. These lugs 35 are adapted to project into the arc-shaped recesses 32 and lie adjacent one end of each of the coil springs 33. This is clearly illustrated in Fig. 5 of the drawings. As illustrated in this figure, the lugs 35 lie adjacent one end of the arcuate recesses 32, and when in this position the rotary member 34 has so positioned the cutting tool 29 that it is in longitudinal alinement with the bore of the work 12. The ends of these arcuate recesses therefore provide a stop for the motion of the cutting tool in one direction, as will be clearly understood.

Interposed between the other end of the springs 33 and the end of the arcuate recesses are blocks 36. The base member 31 is suitably cut away, as at 37, to enable adjusting screws 38 to be mounted on the member 31. These adjusting screws have their inner ends projecting into the arcuate recesses 32 to abut against the blocks 36. Therefore, when it is desired to increase the tension upon the springs 33, this may be accomplished by operating the screws 38 to shorten the distance betwen the lugs 35 and the blocks 36.

The rotary member 34 is provided with a ridge 39, and the member 31 with a seat 40. These two members 31 and 34 are held together by a centrally disposed bolt 41.

The upper end of the rotary member 34 is squared, as at 42, and provided with a beveled recess 43. Slidably mounted in this beveled recess 43 is a block 44, having its lower part suitably shaped to engage the beveled recess 43. Face plates 45 are secured to the squared portion 42 and limit the travel of the block 44. The shank 30 of the tool 29 is adapted to pass through the plates 45 and the block 44. The block 44 is rigidly secured to the shank 30 by set screws 46, thereby causing the block 44 to move with the tool 29. The face plates 45, however, are suitably apertured to allow the shank 30 of the cutting tool to pass freely therethrough. Secured to one of the face plates 45 is a tubular housing 47, through which the shank 30 of the cutting tool is also adapted to project. The outer end of this tubular housing is provided with a screw-threaded collar 48, against which one end of a coil spring 49 is adapted to bear. This coil spring is adapted to surround the shank 30 and has its inner end bearing against the block 44. By this arrangement the cutting tool 29 will normally be projected to the position illustrated in Fig. 4, by reason of the pressure exerted on the block 44 by the spring 49. The tool carrier is secured to the table 16 by bolts passing through ears 50.

It is obvious that with the structure just recited, when a pressure is exerted upon the outer end of the cutting tool 29 sufficient to overcome the tension of the spring 49, the cutting tool will be moved longitudinally. This motion of the cutting tool will consequently move the block 44 against the tension of the spring 49 until it abuts the rear face plate 45. When the pressure has been taken off of the tool 29, the spring will restore it to its normal position. It is also apparent that by adjusting the block 44 on the shank 30 of the cutting tool, various degrees of tension may be put upon the spring 49.

I will now describe the operation of my invention: In forming bottle molds, for instance, it is customary to bore the work piece (indicated in the drawings as at 12) centrally thereof to allow for the insertion of the cutting tool 29.

While the feeding of the cutting tool 29 which corresponds to the shaping of the work is taken care of by the cam groove and the appurtenant parts thereto, means must be provided for keeping the tool in cutting position upon the work as the material is cut away. This is accomplished by the rotary resilient tool carrier, in the following manner: As hereinbefore stated, the work is bored centrally thereof, and in this position is ready for the reception of the cutting tool. The rotary tool holder is therefore turned against tension of springs 33, tension being put on these springs by reason of the lugs 35 which project from the rotary portion 34 of the tool carrier. The device will be made to assume the position illustrated in dotted lines in Fig. 1, in which the tool 29 is shown at an angle. As the table advances toward and is retracted from the work, the tool will cut a layer of material from the work piece corresponding to the pressure applied thereto by the springs 33. Consequently, as the material is cut away from the work piece the springs 33 will cause the tool carrier to return to its normal position, in which it is in longitudinal alinement with the bore of the work. Therefore, when material of greater resistance is operated upon, the tension of the springs 33 may be adjusted and the cutter 29 caused to bear with a greater pressure against the work.

It is ofttimes found that when the tool is being advanced toward the work, and particularly when it is riding up the portion of the work corresponding to the neck of a bottle, the same will come in contact with a flaw in the material or a particularly hard portion thereof, which will cause an unusal longitudinal pressure to be exerted upon the tool 29. This is very apt to prove disastrous, and in order to safeguard against the destruction of the cutting tool, should such an accident occur, I have provided the spring 49, block 44 and appurtenant parts thereto, which will allow a longitudinal movement of the cutting tool. Therefore, when the tool strikes a flaw in the work its connection with the tool carrier will allow it to remain stationary for a brief period of time, the motion being taken up by the compression of the spring 49. However, as the table and tool carrier advance, the cam groove 21 will move the tool transversely to carry it away from the flaw in the work. As a tool is being withdrawn from the work and the cutting operation continues, these rough portions will be cut away by the tool.

When work of larger proportions is to be operated upon, the position of the tool carrier may be made to accommodate such work by adjusting the pin 25 in the slot 19. In this way I am enabled to use the cutter for outside as well as interior cutting.

Various modifications may be made in the specific structure illustrated, without departing from the spirit and scope of my invention, and it is understood that I particularly reserve this right.

Having thus described my invention, what I claim is:—

1. A device of the class described comprising a tool holder formed in two sections, one of said sections being relatively rotatable about a central axis, a cutting tool mounted on said rotatable section, said rotatable section being adapted to be rotated to cause said tool to engage the work piece and means in said tool holder and acting upon said rotatable section tending to rotate it in a direction to cause the cutting face of said tool to constantly engage the work piece.

2. In a device of the class described a cutting tool, a tool carrier, means for resiliently mounting said tool upon said carrier, said means permitting a longitudinal displacement thereof, said tool carrier being formed in sections relatively oscillatable and means tending to normally retain said tool carrier sections in a position wherein said tool is in longitudinal alinement with the work to be cut.

3. In a device of the class described, a cutting tool, a tool carrier formed in two sections, means for connecting said sections whereby relative oscillation of the sections is permitted, said means normally retaining said sections in a fixed relative position and means for mounting said tool upon one of the sections whereby a longitudinal displacement of said tool is permitted.

4. In a device of the class described a cutting tool, a tool carrier, said carrier being formed in two sections and united so as to permit one section to oscillate relatively to the other section, one section being provided with recesses in which are disposed springs, projections formed on the other section and engaging said springs, whereby the section of the carrier upon which said tool is mounted may be oscillated to cause said tool to engage the work to be cut, the connection between the carrier sections maintaining said tool in constant engagement with the work to be cut.

5. An arrangement of the class described comprising a cutting tool, a carrier therefor, said carrier being formed in two sections relatively rotatable, spring means tending to normally hold said carrier sections in a position of rest, means for resiliently mounting said tool on one section of the carrier, said means embodying a block slidably guided on the carrier section, means for limiting the movement of said block and for detachably securing said block to said tool and spring means for moving said block so as to project said tool in the direction of the work to be cut.

6. In a device of the class described a cutting tool, a tool carrier, said carrier being formed in two sections and united so as to permit one section to oscillate relatively to the other section, one section being provided with recesses in which are disposed springs, projections formed on the other section and engaging said springs, whereby the section of the carrier upon which said tool is mounted may be oscillated to cause said tool to engage the work to be cut, the connection between the carrier sections maintaining said tool in constant engagement with said work and means for adjusting the tension of said springs, as and for the purpose set forth.

MONROE G. HUSTED.